United States Patent
Levi et al.

(10) Patent No.: US 11,893,086 B2
(45) Date of Patent: Feb. 6, 2024

(54) SHAPE-BIASED IMAGE CLASSIFICATION USING DEEP CONVOLUTIONAL NETWORKS

(71) Applicant: GM GLOBAL TECHNOLOGY OPERATIONS LLC, Detroit, MI (US)

(72) Inventors: Dan Levi, Kyriat Ono (IL); Noa Garnett, Herzliya (IL); Roy Uziel, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 374 days.

(21) Appl. No.: 17/197,678

(22) Filed: Mar. 10, 2021

(65) Prior Publication Data
US 2022/0292316 A1   Sep. 15, 2022

(51) Int. Cl.
*G06F 18/00* (2023.01)
*G06F 18/241* (2023.01)
(Continued)

(52) U.S. Cl.
CPC .......... *G06F 18/241* (2023.01); *G06F 18/214* (2023.01); *G06N 3/08* (2013.01); *G06V 20/56* (2022.01)

(58) Field of Classification Search
CPC .......... G06N 3/08; G06N 20/00; G06N 3/045; G06N 3/0464; G06N 3/09; G06F 18/24; G06F 18/241; G06F 18/253; G06F 30/27; G06F 18/213; G06V 10/82; G06V 20/56; G06V 20/58; G06V 10/764; G06V 10/454; G06V 10/44; G06T 2207/30252; G06T 7/73
See application file for complete search history.

(56) References Cited

U.S. PATENT DOCUMENTS

| | | | |
|---|---|---|---|
| 2019/0012599 A1* | 1/2019 | el Kaliouby | G06N 3/084 |
| 2020/0350057 A1* | 11/2020 | el Kaliouby | G16H 40/67 |
| 2022/0067519 A1* | 3/2022 | Mishra | G06V 40/16 |

FOREIGN PATENT DOCUMENTS

| | | | | |
|---|---|---|---|---|
| CN | 106875511 A | * | 6/2017 | |
| CN | 108710826 A | * | 10/2018 | G06K 9/00818 |

OTHER PUBLICATIONS

Convolutional neural network—Wikipedia (Year: 2023).*
(Continued)

*Primary Examiner* — Ping Y Hsieh
*Assistant Examiner* — Xiao Liu
(74) *Attorney, Agent, or Firm* — CANTOR COLBURN LLP

(57) ABSTRACT

A system for analyzing images includes a processing device includes a receiving module configured to receive an image, and an analysis module configured to apply the received image to a machine learning network and classify one or more features in the received image, the machine learning network configured to propagate image data through a plurality of convolutional layers, each convolutional layer of the plurality of convolutional layers including a plurality of filter channels, the machine learning network including a bottleneck layer configured to recognize an image feature based on a shape of an image component, The system also includes an output module configured to output characterization data that includes a classification of the one or more features.

17 Claims, 4 Drawing Sheets

(51) Int. Cl.
*G06N 3/08* (2023.01)
*G06V 20/56* (2022.01)
*G06F 18/214* (2023.01)

(56) References Cited

OTHER PUBLICATIONS

Geirhos et al., ImageNet-Trained CNNS are biased towards texture; Increasing Shape Bias Improves Accuracy and Robustness, arXiv:1811.12231v2 Jan. 14 (Year: 2019).*
Hermann et al., The origins and Prevalence of Texture Bias in Convolutional Neural Networks, arXiv:1911.09071v2 Jun. 29 (Year: 2020).*
He et al., Deep Residual Learning for Image Recognition, CVPR (Year: 2016).*
Geirhos et al.; "ImageNet-trained CNNs are biased towards texture; increasing shape bias improves accuracy and robustness"; ICLR; Jan. 14, 2019.
Gidaris et al.; "Unsupervised Representation Learning by Predicting Image Rotations"; ICLR 2018; Mar. 12, 2018.
Hermann et al.; "The Origins and Prevalence of Texture Bias in Convolutional Neural Networks"; NeurIPS 2020; Nov. 3, 2020.

* cited by examiner

SHAPE-BIASED IMAGE CLASSIFICATION USING DEEP CONVOLUTIONAL NETWORKS

INTRODUCTION

The subject disclosure relates to the art of image analysis and, more particularly, to a system and method for image recognition training a classification model and characterizing images in different domains.

Modern vehicles are increasingly equipped with cameras and/or other imaging devices and sensors to facilitate vehicle operation and increase safety. Cameras can be included in a vehicle for various purposes, such as increased visibility and driver awareness, assisting a driver and performing vehicle control functions. Autonomous control of vehicles is becoming more prevalent, and autonomous control systems are equipped with the capability to identify environmental objects and features using cameras and other sensors, such as radar sensors.

SUMMARY

In one exemplary embodiment, a system for analyzing images includes a processing device including a receiving module configured to receive an image, and an analysis module configured to apply the received image to a machine learning network and classify one or more features in the received image, the machine learning network configured to propagate image data through a plurality of convolutional layers, each convolutional layer of the plurality of convolutional layers including a plurality of filter channels, the machine learning network including a bottleneck layer configured to recognize an image feature based on a shape of an image component, The system also includes an output module configured to output characterization data that includes a classification of the one or more features.

In addition to one or more of the features described herein, the machine learning network is a deep convolutional neural network.

In addition to one or more of the features described herein, the bottleneck layer is a convolutional layer, and the machine learning network includes at least one pooling layer, and a fully connected layer configured to apply one or more classifications to the received image based on outputs from the bottleneck layer and the plurality of convolutional layers.

In addition to one or more of the features described herein, the bottleneck layer is configured to apply a single filter to the image data.

In addition to one or more of the features described herein, the received image includes a plurality of image channels, and the bottleneck layer is configured to apply a single filter to the plurality of image channels.

In addition to one or more of the features described herein, the analysis module is configured to train the machine learning network by propagating a plurality of training images through the machine learning network.

In addition to one or more of the features described herein, the analysis module is configured to apply a sparseness regularization to the bottleneck layer to force representation of shapes.

In addition to one or more of the features described herein, the sparseness regularization is selected from at least one of an L1 regularization, and a sigmoid function.

In one exemplary embodiment, a method of analyzing images includes receiving an image by a receiving module, and applying, by an analysis module, the received image to a machine learning network and classifying one or more features in the received image, the machine learning network configured to propagate image data through a plurality of convolutional layers, each convolutional layer of the plurality of convolutional layers including a plurality of filter channels, the machine learning network including a bottleneck layer configured to recognize an image feature based on a shape of an image component. The method also includes outputting characterization data that includes a classification of the one or more features.

In addition to one or more of the features described herein, the machine learning network is a deep convolutional neural network.

In addition to one or more of the features described herein, the bottleneck layer is a convolutional layer, and the machine learning network includes at least one pooling layer, and a fully connected layer configured to apply one or more classifications to the received image based on outputs from the bottleneck layer and the plurality of convolutional layers.

In addition to one or more of the features described herein, the bottleneck layer is configured to apply a single filter to the image data.

In addition to one or more of the features described herein, the received image includes a plurality of image channels, and the bottleneck layer is configured to apply a single filter to the plurality of image channels.

In addition to one or more of the features described herein, the method further includes training the machine learning network by propagating a plurality of training images through the machine learning network.

In addition to one or more of the features described herein, the training includes applying a sparseness regularization to the bottleneck layer to force representation of shapes.

In addition to one or more of the features described herein, the sparseness regularization is selected from at least one of an L1 regularization, and a sigmoid function.

In one exemplary embodiment, a vehicle system includes a memory having computer readable instructions, and a processing device for executing the computer readable instructions. The computer readable instructions control the processing device to perform receiving an image by a receiving module, and applying, by an analysis module, the received image to a machine learning network and classifying one or more features in the received image, the machine learning network configured to propagate image data through a plurality of convolutional layers, each convolutional layer of the plurality of convolutional layers including a plurality of filter channels, the machine learning network including a bottleneck layer configured to recognize an image feature based on a shape of an image component. The computer readable instructions also control the processing device to perform outputting characterization data that includes a classification of the one or more features.

In addition to one or more of the features described herein, the machine learning network is a deep convolutional neural network.

In addition to one or more of the features described herein, the bottleneck layer is configured to apply a single filter to the image data.

In addition to one or more of the features described herein, the received image includes a plurality of image channels, and the bottleneck layer is configured to apply a single filter to the plurality of image channels.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
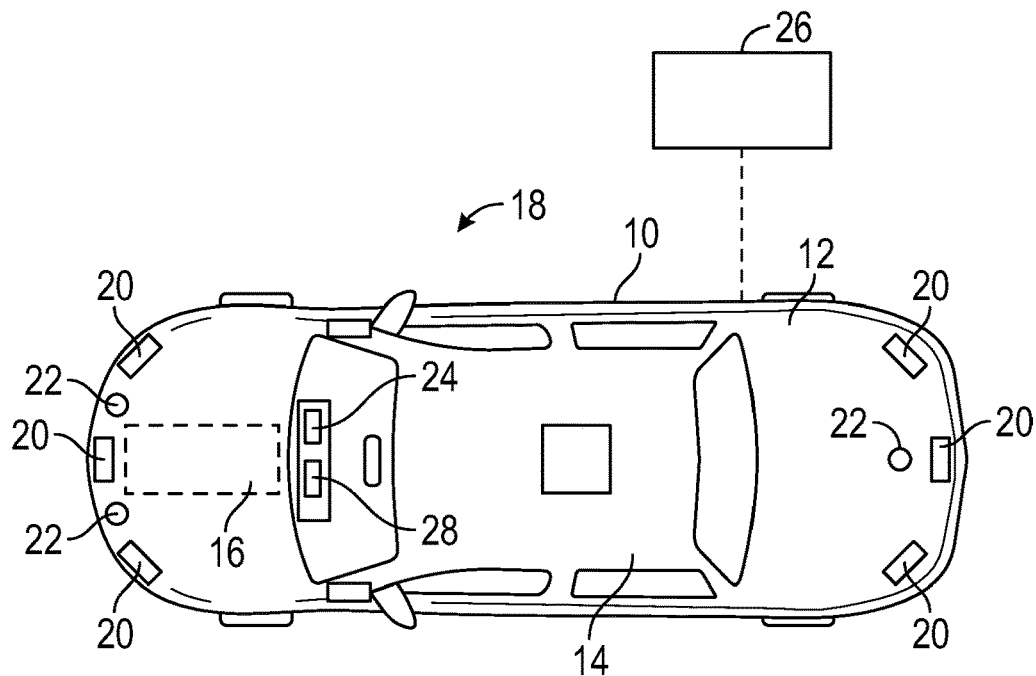
FIG. 1 is a top view of a motor vehicle including aspects of an image analysis system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for image analysis are described herein. An embodiment of an image analysis and/or detection system is configured to receive image data from an imaging device (e.g., a camera), and apply the image data to a machine learning network using a machine learning algorithm. In an embodiment, the machine learning network is a deep convolutional neutral network (CNN). The image data may include images having one image channel (e.g., grayscale or black-and-white images) or images having multiple image channels (e.g., color component channels).

An embodiment of the image analysis system includes a machine learning architecture, such as a convolutional neural network architecture, that includes a plurality of convolution layers. Each convolution layer includes a plurality of filter channels for detection of image features. The architecture also includes one or more "bottleneck" layers. A bottleneck layer is a convolution layer that has a restricted number channels, so that the algorithm is forced to only detect a feature that can be detected using a single filter (for a given image channel). In an embodiment, the bottleneck layer has only a single filter channel, or a single filter channel for each image channel.

Embodiments also include methods of training the machine learning network. Aspects of training are provided that increase the shape-bias of the network, and thereby improve the network's ability to identify shapes and reduce texture-bias. For example, a sparseness regularization may be included at the bottleneck channel. In another example, an auxiliary pre-text task is performed during training to cause the network to learning global object shapes. A "global object shape" of an object refers to the shapes of the object at various rotational orientations or angular positions.

The network may be generated and/or updated using one or more machine learning algorithms. Examples of such algorithms include deep learning, supervised learning, unsupervised learning, semi-supervised learning, multi-task learning and others.

Embodiments described herein present a number of advantages. The system provides an effective way to analyze images with improved shape recognition as compared to conventional analysis techniques, including conventional deep convolutional networks. The embodiments provide for improved shape-bias as compared to conventional networks. "Shape-bias" refers to a network's ability classifies images based on their shape rather than their texture, in accordance with human vision. Another advantage is improved explainability of the network's decision. Improved shape-bias has the potential to improve the network in test time in three aspects, for example: better generalization in degraded visibility scenarios, generalization to new tasks and robustness to adversarial attacks.

FIG. 1 shows an embodiment of a motor vehicle 10, which includes a vehicle body 12 defining, at least in part, an occupant compartment 14. The vehicle body 12 also supports various vehicle subsystems including an engine system 16, and other subsystems to support functions of the engine system 16 and other vehicle components, such as a braking subsystem, a steering subsystem, a fuel injection subsystem, an exhaust subsystem and others.

One or more aspects of an image acquisition and analysis system 18 may be incorporated in or connected to the vehicle 10. The image analysis system 18 in this embodiment includes one or more optical cameras 20 configured to take images such as color (RGB) images. Images may be still images or video images. Additional devices or sensors may be included in the image analysis system 18. For example, one or more radar assemblies 22 may be included in the vehicle 10.

The cameras 20 and/or radar assemblies 22 communicate with one or more processing devices, such as an on-board processing device 24 and/or a remote processor 26, such as a processor in a mapping or imaging system. The vehicle 10 may also include a user interface system 28 for allowing a user (e.g., a driver or passenger) to input data, view images, view features identified by image analyses as discussed herein, and otherwise interact with a processing device and/or the image analysis system 18.

Figure 2:
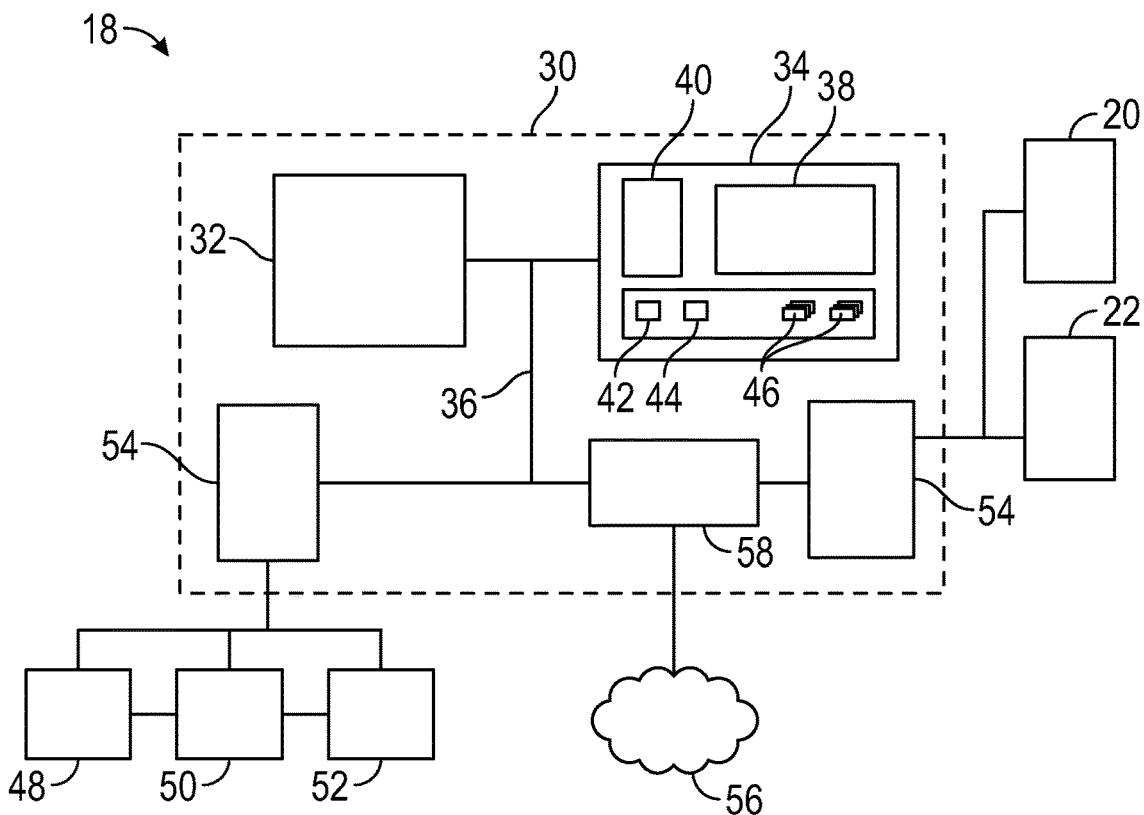
FIG. 2 depicts a computer system configured to perform aspects of image analysis, in accordance with an exemplary embodiment.

FIG. 2 illustrates aspects of an embodiment of a computer system 30 that is in communication with, or is part of, the image analysis system 18, and that can perform various aspects of embodiments described herein. The computer system 30 includes at least one processing device 32, which generally includes one or more processors for performing aspects of image acquisition and analysis methods described herein. The processing device 32 can be integrated into the vehicle 10, for example, as the on-board processor 24, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform image detection and analysis methods described herein, and may also perform functions related to control of various vehicle subsystems.

Components of the computer system 30 include the processing device 32 (such as one or more processors or processing units), a system memory 34, and a bus 36 that couples various system components including the system memory 34 to the processing device 32. The system memory 34 may include a variety of computer system readable media. Such media can be any available media that is accessible by the processing device 32, and includes both volatile and non-volatile media, removable and non-removable media.

For example, the system memory 34 includes a non-volatile memory 38 such as a hard drive, and may also include a volatile memory 40, such as random access memory (RAM) and/or cache memory. The computer system 30 can further include other removable/non-removable, volatile/non-volatile computer system storage media.

The system memory 34 can include at least one program product having a set (e.g., at least one) of program modules that are configured to carry out functions of the embodiments described herein. For example, the system memory 34 stores various program modules that generally carry out the functions and/or methodologies of embodiments described herein. A receiving module 42 may be included to perform functions related to acquiring and processing received images and information from sensors, and an image analysis or processing module 44 may be included to perform functions related to image analysis, such as executing machine learning algorithms, generating models and labeling images. The system memory 34 may also store various data structures 46, such as data files or other structures that store data related to image detection and analysis. Examples of such data structures include camera images, radar images, models, and labeled images. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 48 such as a keyboard, a pointing device, and/or any devices (e.g., network card, modem, etc.) that enable the processing device 32 to communicate with one or more other computing devices. In addition, the processing device 32 can communicate with one or more devices such as the cameras 20 and the radar assemblies 22 used for image analysis. The processing device 32 can also communicate with other devices that may be used in conjunction with the image analysis, such as a Global Positioning System (GPS) device 50 and vehicle control devices or systems 52 (e.g., for driver assist and/or autonomous vehicle control). Communication with various devices can occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
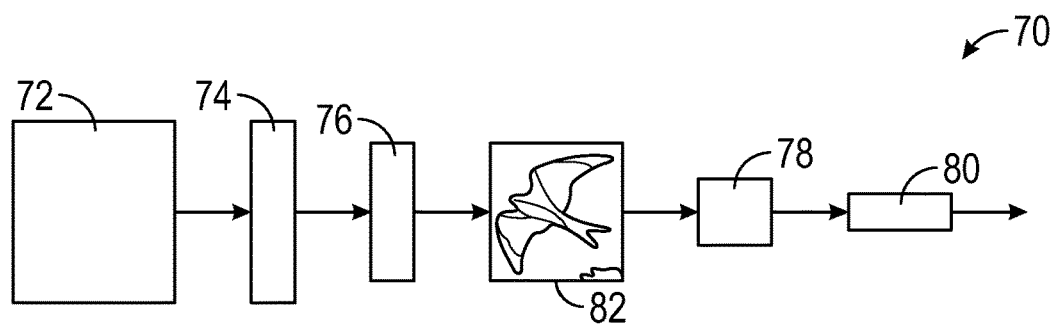
FIG. 3 depicts a deep convolutional neural network, in accordance with an exemplary embodiment.

FIG. 3 is a block diagram depicting aspects of an embodiment of an architecture of a deep convolutional neural network 70. The network 70 is configured to receive an image (e.g., a camera image from the vehicle 10), and pass image data through one or more convolution layers. Each convolution layer includes a set of learnable filters (matrix of values) that slide across an image to detect corresponding features. Each filter is applied to image data and maps onto an output matrix, referred to as an activation map or feature map. The feature map includes a value of the filter at every spatial location traversed by the filter, and thereby indicates the presence or absence of a feature to be detected by the filter.

The network 70 may have any number of convolution layers, and each convolution layer may include any number of filters. A filter in a convolution layer may also be referred to as a channel. As discussed further herein, the network may include additional layers, such as pooling layers.

For example, an input image 72 such as a camera image is input to a first convolution layer 74, which includes a plurality of filters, where each filter is configured to detect a corresponding feature (e.g., line curve, color, etc.). These features may be low-level features that are combined in later layers to recognize more complex features. The first convolution layer 74 outputs a set of feature maps, which are input to a second convolution layer 76 that has its own group of filters, and outputs a corresponding set of feature maps. The network 70 may include any number of additional convolution layers, such as a third convolution layer 78. The outputs of the previous layers are then input to a fully connected (FC) layer 80, which acts as a classifier and outputs classification labels based on the layer outputs. It is noted that the convolution network architecture is not limited to any specific type or number of filters and/or layers.

An embodiment of the network 70 also includes a convolution layer 82 that has a single convolutional channel, or a number of convolution channels that is less than a threshold number. The threshold number is selected to force the convolution network algorithm to use a filter related to shape and prevent the convolution layer 82 from encoding texture or other features that typically need multiple filters or channels to encode. For example, a typical convolutional neural network includes multiple filters in a convolution layer to recognize texture; by reducing the number of available channels, the algorithm cannot encode for texture at the convolution layer 82, and is instead "forced" to encode by shape. In this way, the convolution network 70 has an increased shape-bias as compared to conventional networks, in that the number of times that shape is recognized instead of texture is increased. For example, the architecture of the network 70 can increase shape bias to about 90% or higher, and can reach levels of shape bias that is comparable to human vision. The convolution layer 82 is also referred to as a "bottleneck layer" 82.

An example of a shape output activation is shown in FIG. 3 as a bird shaped filter, which was configured based on previously applied training data. It is noted that this shape is provided for illustration purposes and is not intended to be limiting.

In an embodiment, the bottleneck layer 82 has a single filter (referred to herein as a "channel" or "filter channel"). Image data (e.g., a received image from a camera or a feature map) input to the bottleneck layer may have more than one image channel. For example, an image input to the network 70 has a single image channel if the image is a grayscale image, or has three image channels if the image is a RBG (red0green-blue) image. In either case, the bottleneck layer has a single filter channel.

When image analysis and/or network training is performed, for example, the first convolution layer 74 slides each filter in the layer 74 over all of the spatial locations in the received image 72, and outputs an activation map (feature map) for each. The first convolution layer 72 outputs the feature maps, which are then applied as inputs to the next convolution layer 76. Feature maps from the convolution layer 76 are applied to the bottleneck layer 82, which applies a single filter to each applied feature map, and in turn outputs features maps to the convolution layer 78. The outputs from all of the convolution layers are then applied to the fully connected layer 80 for classification. As discussed further herein, a pooling layer may be disposed between two convolution layers to simplify the feature maps and reduce their dimensions.

Figure 4:
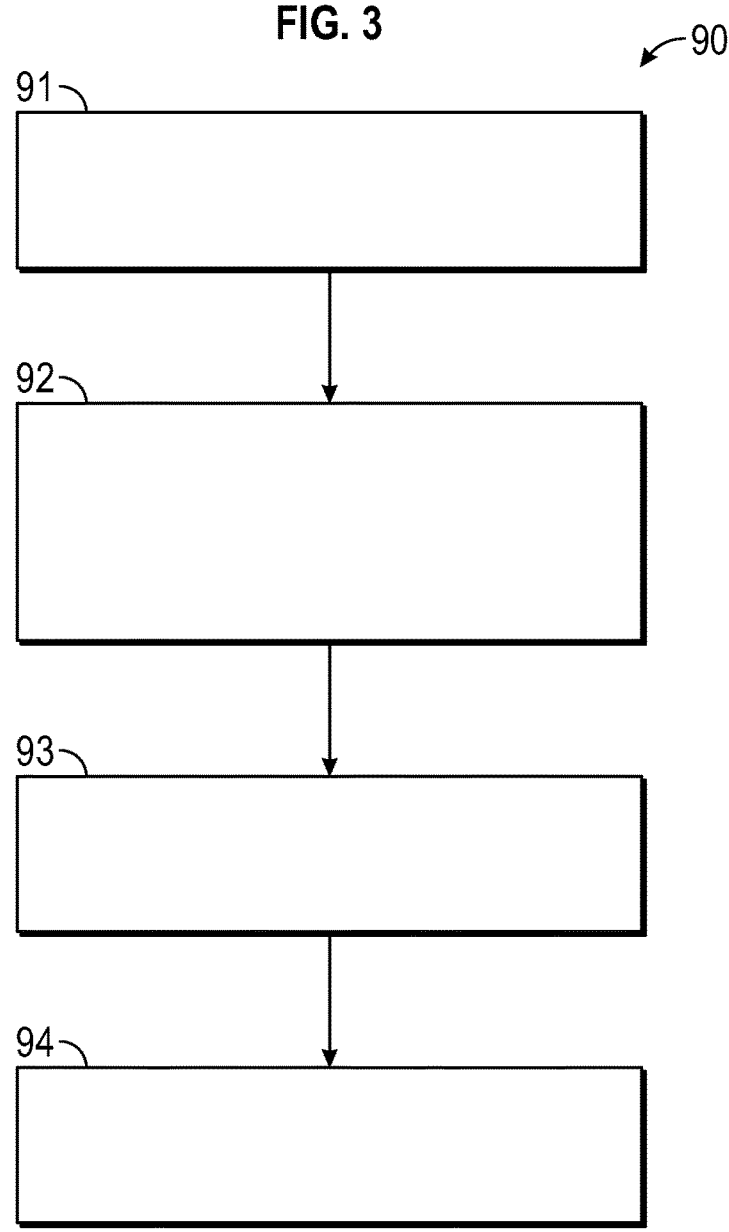
FIG. 4 is a flow chart depicting aspects of a method of analyzing images using the convolutional neural network of FIG. 3, in accordance with an exemplary embodiment.

FIG. 4 depicts an embodiment of a method 90 of analyzing image data. The image analysis system 18 and/or the image analysis module 44, or other processing device or system, may be utilized for performing aspects of the method 90. The method 90 is discussed in conjunction with blocks 91-94. The method 90 is not limited to the number or order of steps therein, as some steps represented by blocks 91-94 may be performed in a different order than that described below, or fewer than all of the steps may be performed.

At block 91, the deep convolutional neural network 70 is trained using multiple training images to configure various filters that can be later used in image recognition and classification. Generally, training includes applying a plurality of images (often thousands or more) to the network 70. Training images may be accompanied by characterization data such as object or feature labels.

At block 92, the network 70 is trained by propagating the training images through the plurality of convolution layers, including the bottleneck layer 82. It is noted that the network may include any desired number of bottleneck layers 82 at any desired positions within the network 70. The training may be performed via any suitable training process, such as supervised or unsupervised training.

In an embodiment, during training, the bottleneck layer 82 includes a sparseness regularization function to force representation of shapes (as opposed to, e.g., texture). For example, L1 regularization may be used to increase the sparseness of activations, L1 regularization of spatial gradient operators may be used to increase the sparseness of gradients, and/or a sigmoid function may be applied to activations to increase the sparseness of activations.

In an embodiment, the training algorithm includes a self-supervised auxiliary training task to improve shape bias. The algorithm can perform rotational prediction of objects or features to learn global object shapes (e.g., the shape of an object in various orientations). For example, the auxiliary training task is trained on an image feature that is rotated about a selected image point to various orientations or angular positions (e.g., 90 degrees, 180 degrees) relative to an initial orientation (zero degrees).

At block 93, an acquired image or images, such as camera images acquired by the vehicle 10, are applied to the trained network 70. The acquired images are processed and identified features or objects are assigned various classifications (e.g., shape, object type such as vehicle, pedestrian, road feature, etc.).

At block 94, the classified images are output to a suitable location, for example, to store the images and classification data, and/or display the image to a user. For example, classified images can be stored in a database or other suitable location for various uses, such as further training, vehicle diagnostics, mapping and others. In one example, the classified image is output to a vehicle control processor such as a control unit for autonomous vehicle operation and/or driver assist.

Figure 5:
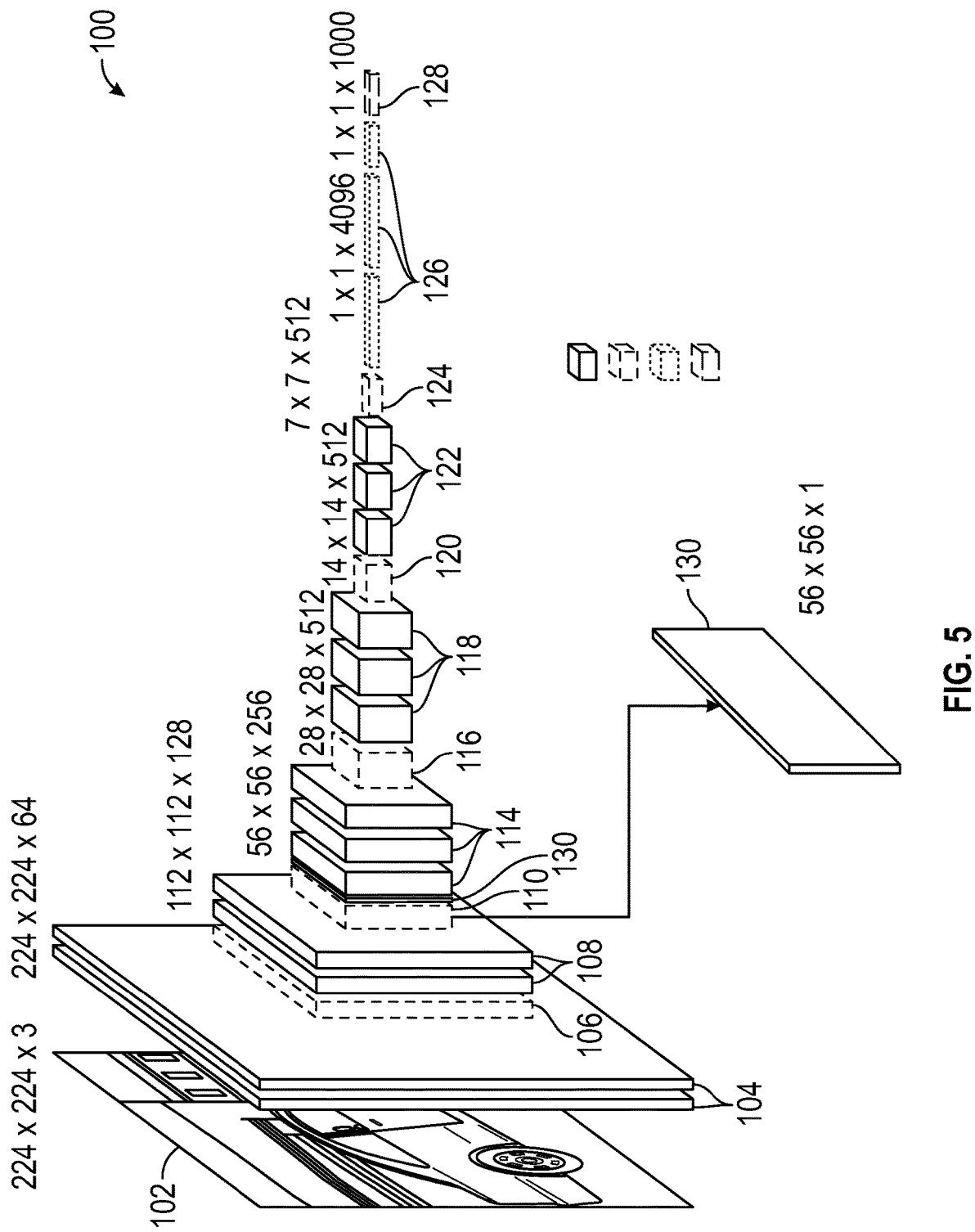
FIG. 5 depicts an example of a deep convolutional neural network, in accordance with an exemplary embodiment.

FIG. 5 depicts an embodiment of a deep convolutional neural network 100 (which may be an example of the network 70). The network 100 is configured to receive an image 102, which may be a training image for training the network 100, or an image input for classification using previously learned filters. The image 102 in this example is a RBG image having a height dimension of 224 pixels, a width dimension of 224 pixels, and three image channels (i.e., the image dimensions are 224×224×3).

A first set of convolution layers 104 has dimensions of 224×224×64 (i.e., each of these layers 104 includes 64 filter channels having a height of 224 pixels and width of 224 pixels). Feature maps (one for each filter) are output to a first pooling layer 106 to pool the feature maps to reduce the dimensions to 112×112. The reduced feature maps are input to a second set of convolution layers 108, which include 128 filter channels.

Outputs from the convolution layers 108 are again reduced at a 56×56 pooling layer 110, and input to a bottleneck layer 130, which has the same dimensions as the pooling layer 110, but has only one filter channel. Thus, the dimensions of the bottleneck layer 130 are 56×56×1.

It is noted that the network 100 may have more than one bottleneck layer, and may have a bottleneck layer or layers are various positions in the network 100.

Outputs from the bottleneck layer are then input to a third set of convolution layers 114, which have dimensions of 56×56 pixels and 256 channel filters. The network 100 also includes a pooling layer 116 to reduce the output feature maps to 28×28 maps, and a fourth set of 28×28 convolution layers 118 (having 512 filters). A further pooling layer 120 and set of convolution layers 122 generate respective output feature maps, which are again pooled at a pooling layer 124 and output to a FC layer 126 and an activation function layer 128 such as softmax to classify the image 102 (e.g., a vehicle, pedestrian, etc.).

Figure 6:
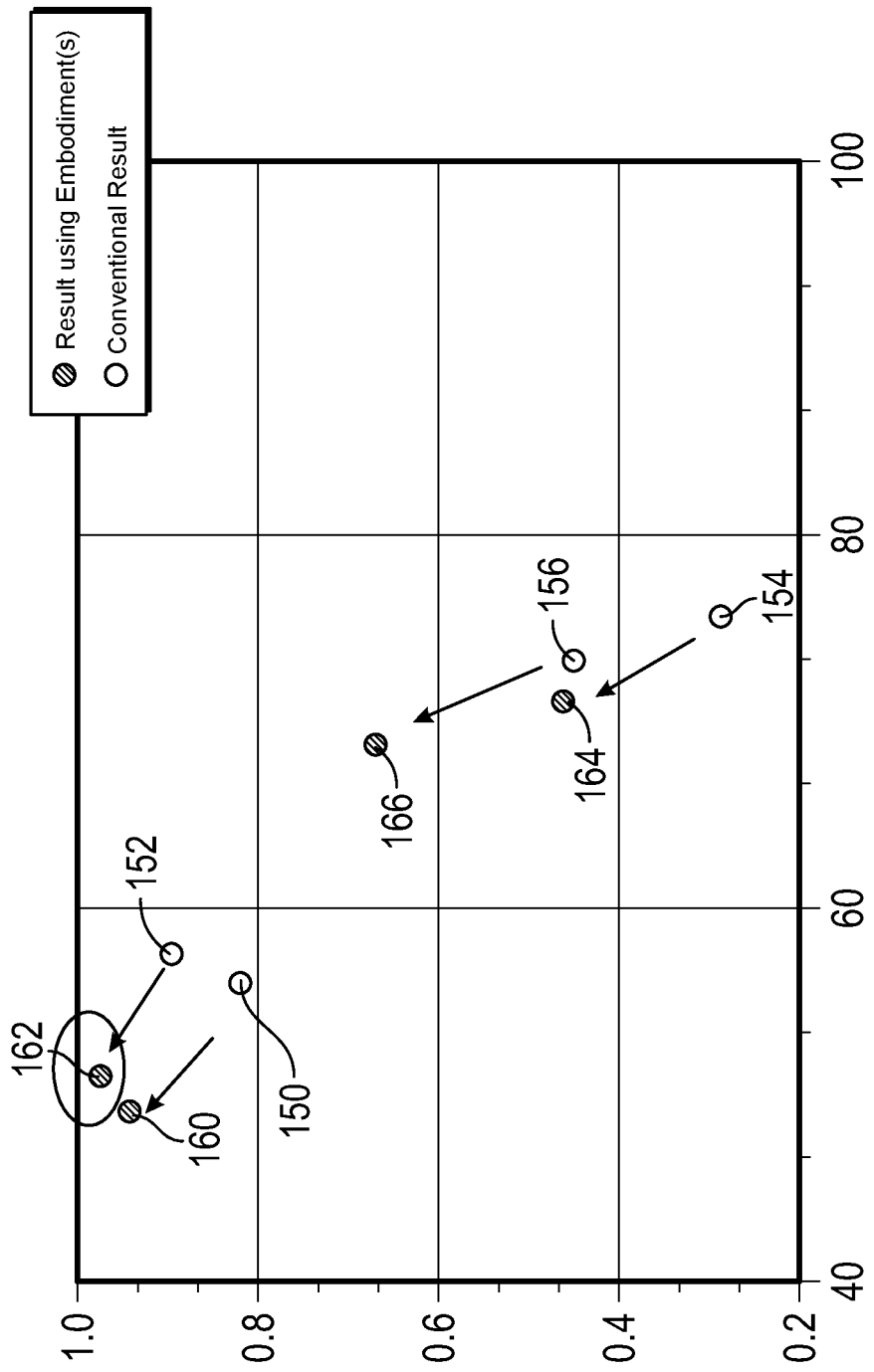
FIG. 6 is a graph that depicts examples of analysis results using the method of FIG. 4, in comparison with analysis results using a conventional convolutional neural network.

FIG. 6 shows results of image analysis using embodiments described herein, as compared to a conventional deep convolutional neural network analysis. FIG. 6 depicts a graph that shows shape bias as a function of accuracy in classifying images. The accuracy is expressed as a percentage of detections in which image features were correctly classified, and the shape bias is expressed as a percentage or proportion of instances where shape was recognized instead of texture. Point 150 shows results of a conventional analysis of a first set of images, and point 160 shows results of analysis of the first set of images using the network 70 and/or 100.

Point 152 shows results of a conventional analysis of a second set of images, and point 162 shows results of analysis of the second set of images using the network 70 and/or 100. Point 154 shows results of a conventional analysis of a third set of images, and point 164 shows results of analysis of the third set of images using the network 70 and/or 100. Lastly, point 156 shows results of a conventional analysis of a fourth set of images, and point 166 shows results of analysis of the fourth set of images using the network 70 and/or 100.

As shown, the shape bias was significantly increased by use of a bottleneck layer, and in some cases was close to human level shape bias (point number). Although accuracy was slightly reduced, the loss of accuracy in these examples was acceptable in view of the significant increase in shape bias.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof Therefore, it is intended that the present disclosure not be limited to the particular embodiments disclosed, but will include all embodiments falling within the scope thereof.

What is claimed is:

1. A system for analyzing images, comprising:
   a processor configured to receive an image;
   an analysis device configured to apply the received image to a machine learning network and classify one or more features in the received image, the machine learning network configured to propagate image data through a plurality of convolutional layers, each convolutional layer of the plurality of convolutional layers including a plurality of filter channels, the plurality of filter channels configured to apply a plurality of filters to the image data and output a feature map for each filter, the machine learning network including a bottleneck layer configured to recognize an image feature based on a shape of an image component, the bottleneck layer configured to prevent encoding of texture and configured to apply a single filter related to the shape of the image component to each feature map; and
   an output device configured to output characterization data that includes a classification of the one or more features.

2. The system of claim 1, wherein the machine learning network is a deep convolutional neural network.

3. The system of claim 1, wherein the bottleneck layer is a convolutional layer, and the machine learning network includes at least one pooling layer, and a fully connected layer configured to apply one or more classifications to the received image based on outputs from the bottleneck layer and the plurality of convolutional layers.

4. The system of claim 1, wherein the received image includes a plurality of image channels, and the bottleneck layer is configured to apply a single filter to the plurality of image channels.

5. The system of claim 1, wherein the analysis device is configured to train the machine learning network by propagating a plurality of training images through the machine learning network.

6. The system of claim 5, wherein the analysis device is configured to apply a sparseness regularization to the bottleneck layer to force representation of shapes.

7. The system of claim 6, wherein the sparseness regularization is selected from at least one of an L1 regularization, and a sigmoid function.

8. A method of analyzing images, comprising:
   receiving an image;
   applying, by an analysis device, the received image to a machine learning network and classifying one or more features in the received image, the machine learning network configured to propagate image data through a plurality of convolutional layers, each convolutional layer of the plurality of convolutional layers including a plurality of filter channels, the plurality of filter channels configured to apply a plurality of filters to the image data and output a feature map for each filter, the machine learning network including a bottleneck layer configured to recognize an image feature based on a shape of an image component, the bottleneck layer configured to prevent encoding of texture and configured to apply a single filter related to the shape of the image component to each feature map; and
   outputting characterization data that includes a classification of the one or more features.

9. The method of claim 8, wherein the machine learning network is a deep convolutional neural network.

10. The method of claim 8, wherein the bottleneck layer is a convolutional layer, and the machine learning network includes at least one pooling layer, and a fully connected layer configured to apply one or more classifications to the received image based on outputs from the bottleneck layer and the plurality of convolutional layers.

11. The method of claim 8, wherein the received image includes a plurality of image channels, and the bottleneck layer is configured to apply a single filter to the plurality of image channels.

12. The method of claim 8, further comprising training the machine learning network by propagating a plurality of training images through the machine learning network.

13. The method of claim 12, wherein the training includes applying a sparseness regularization to the bottleneck layer to force representation of shapes.

14. The method of claim 13, wherein the sparseness regularization is selected from at least one of an L1 regularization, and a sigmoid function.

15. A vehicle system comprising:
   a memory having computer readable instructions; and
   a processor for executing the computer readable instructions, the computer readable instructions controlling the processor to perform:
   receiving an image;
   applying, by an analysis device, the received image to a machine learning network and classifying one or more features in the received image, the machine learning network configured to propagate image data through a plurality of convolutional layers, each convolutional layer of the plurality of convolutional layers including a plurality of filter channels, the plurality of filter channels configured to apply a plurality of filters to the image data and output a feature map for each filter, the machine learning network including a bottleneck layer configured to recognize an image feature based on a shape of an image component, the bottleneck layer configured to prevent encoding of texture and configured to apply a single filter related to the shape of the image component to each feature map; and
   outputting characterization data that includes a classification of the one or more features.

16. The vehicle system of claim 15, wherein the machine learning network is a deep convolutional neural network.

17. The vehicle system of claim 15, wherein the received image includes a plurality of image channels, and the bottleneck layer is configured to apply a single filter to the plurality of image channels.

* * * * *